United States Patent
Sikina et al.

(10) Patent No.: US 11,482,795 B2
(45) Date of Patent: Oct. 25, 2022

(54) SEGMENTED PATCH PHASED ARRAY RADIATOR

(71) Applicant: RAYTHEON COMPANY, Waltham, MA (US)

(72) Inventors: Thomas V. Sikina, Acton, MA (US); John P. Haven, Lowell, MA (US); Gregory M. Fagerlund, Peabody, MA (US); James Benedict, Tewksbury, MA (US); Andrew Southworth, Lowell, MA (US); Kevin Wilder, Derry, NH (US)

(73) Assignee: RAYTHEON COMPANY, Waltham, MA (US)

( * ) Notice: Subject to any disclaimer, the term of this patent is extended or adjusted under 35 U.S.C. 154(b) by 72 days.

(21) Appl. No.: 16/744,774

(22) Filed: Jan. 16, 2020

(65) Prior Publication Data
US 2021/0226343 A1   Jul. 22, 2021

(51) Int. Cl.
*H01Q 21/06* (2006.01)
*B33Y 80/00* (2015.01)
*H01Q 1/38* (2006.01)
*H01Q 9/04* (2006.01)

(52) U.S. Cl.
CPC ............ *H01Q 21/065* (2013.01); *B33Y 80/00* (2014.12); *H01Q 1/38* (2013.01); *H01Q 9/045* (2013.01)

(58) Field of Classification Search
CPC ........ H01Q 21/065; H01Q 9/045; H01Q 1/38; H01Q 1/246; H01Q 21/24; B33Y 80/00
See application file for complete search history.

(56) References Cited

U.S. PATENT DOCUMENTS

| | | | | |
|---|---|---|---|---|
| 5,777,584 | A | * | 7/1998 | Rothe .................... H01Q 9/045 343/700 MS |
| 7,038,625 | B1 | * | 5/2006 | Taylor ................ H01Q 21/0093 343/700 MS |
| 9,831,564 | B1 | | 11/2017 | Xie |
| 10,236,593 | B2 | | 3/2019 | Dufilie et al. |
| 2015/0162663 | A1 | | 6/2015 | Boryseenko et al. |
| 2016/0218439 | A1 | * | 7/2016 | Fasenfest ............. H01Q 21/065 |
| 2019/0013580 | A1 | * | 1/2019 | Vigano ............. H01Q 21/0093 |
| 2019/0089053 | A1 | | 3/2019 | Yong et al. |

(Continued)

FOREIGN PATENT DOCUMENTS

DE   112017006728 T5   12/2019

OTHER PUBLICATIONS

International Search Report and Written Opinion for International Application No. PCT/US2021/013569; International Filing Date Jan. 15, 2021; dated Apr. 20, 2021; 13 Pages.

(Continued)

*Primary Examiner* — David E Lotter
(74) *Attorney, Agent, or Firm* — Cantor Colburn LLP

(57) ABSTRACT

An antenna and method of manufacturing an antenna. The antenna includes a radiator feed layer, a first radiator patch assembly attached to the radiator feed layer, and a second radiator patch assembly attached to the radiator feed layer. The first radiator patch assembly is separated from the second radiator patch assembly by an air gap. The first radiator patch assembly is attached to the radiator feed layer and the second radiator patch assembly is attached to the radiator feed layer separated from the first radiator patch assembly by the air gap.

17 Claims, 6 Drawing Sheets

(56) References Cited

U.S. PATENT DOCUMENTS

| | | | |
|---|---|---|---|
| 2020/0266519 A1* | 8/2020 | Lee | H01Q 1/2283 |
| 2020/0328530 A1* | 10/2020 | Park | H01Q 1/2283 |
| 2021/0175609 A1* | 6/2021 | Ryoo | H01Q 1/2283 |
| 2021/0184366 A1* | 6/2021 | Vigano | H01Q 21/0093 |

OTHER PUBLICATIONS

Waterhouse, et al., "Highly Efficient Direct Contact Stacked Patches on High Dielectric Constant Wafers", 2011 IEEE International Symposium on Antennas and Propagation (APSURSI), Glen Burnie, MD USA, pp. 3091-3094, IEEE Xplore.

\* cited by examiner

SEGMENTED PATCH PHASED ARRAY RADIATOR

BACKGROUND

The present invention is directed to an antenna assembly for a phased array system and method of manufacture of the antenna assembly and, in particular, to a patch antenna assembly having segmented patch radiators and its method of manufacture.

A patch antenna is an antenna formed by a patch or flat metal surface that separated from a ground layer by a substrate, typically a dielectric material. The patch and the ground layer form a cavity and electrical excitation of the patch creates an electromagnetic wave in the cavity for transmission. A phased array of patch antennas can be formed by placing a plurality of spaced-apart patches on the substrate to form an ordered array of patches on the dielectric material. Surface waves formed by excitation of the phased array are guided waves contained within the substrate. These surface waves are known to exist in generally all phased array systems, and affect the presence of grating lobes within real space, thereby limiting performance. The existence of surface waves through the dielectric material results in a reduced size of a scan volume possible for the phased array. There is therefore a need for a patch antenna that reduces the effect of surface waves on scan volume.

SUMMARY

According to one embodiment of the present disclosure, an antenna is disclosed. The antenna includes a radiator feed layer, a first radiator patch assembly attached to the radiator feed layer, and a second radiator patch assembly attached to the radiator feed layer, wherein the first radiator patch assembly is separated from the second radiator patch assembly by an air gap.

According to another embodiment of the present disclosure, a method of manufacturing an antenna is disclosed. The method includes forming a radiator feed layer, attaching a first radiator patch assembly to the radiator feed layer, and attaching a second radiator patch assembly to the radiator feed layer, wherein the first radiator patch assembly is separated from the second radiator patch assembly by an air gap.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
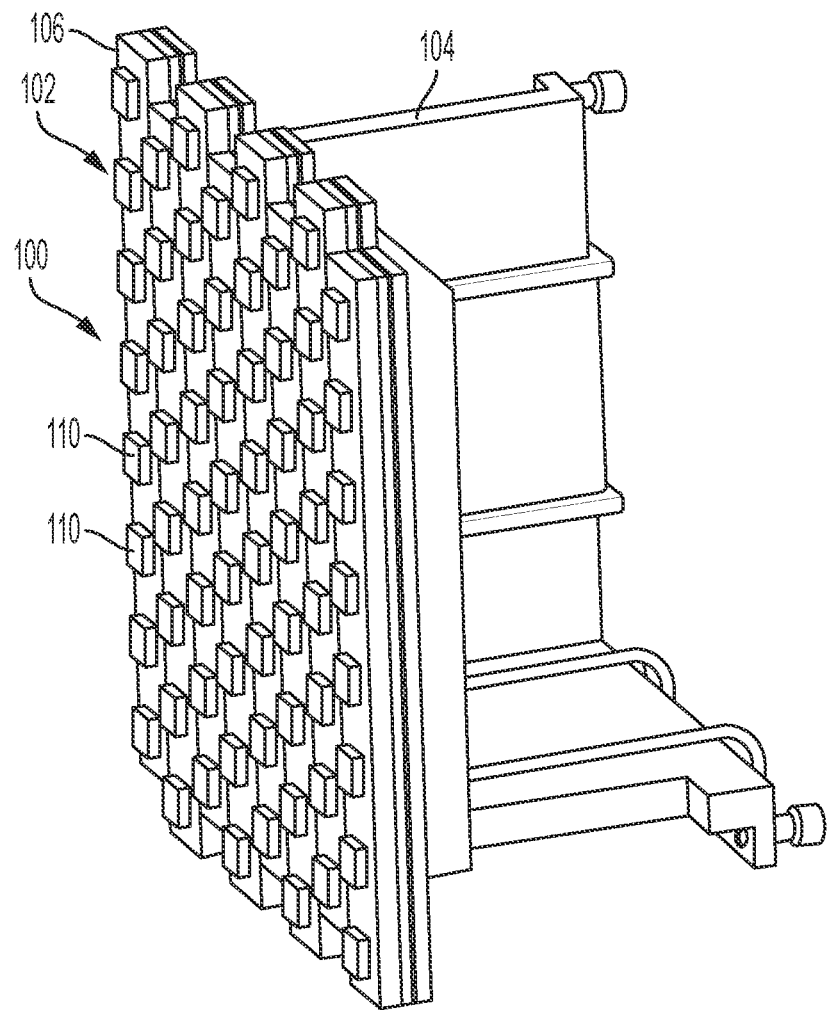
FIG. 1 shows an illustrative antenna structure in an embodiment of the present invention.

FIG. 1 shows an illustrative antenna structure 100 in an embodiment of the present invention. The antenna structure 100 includes a segmented patch antenna assembly 102 attached to a mounting structure 104. The segmented patch antenna assembly 102 includes a ground plane 106 with a plurality of patch antennas 110 formed thereon. The patch antennas 110 can be attached to the ground plane or constructed on top of the ground plane 106 using solder reflow, additive manufacturing techniques (AMT), or other suitable manufacturing techniques.

Figure 2:
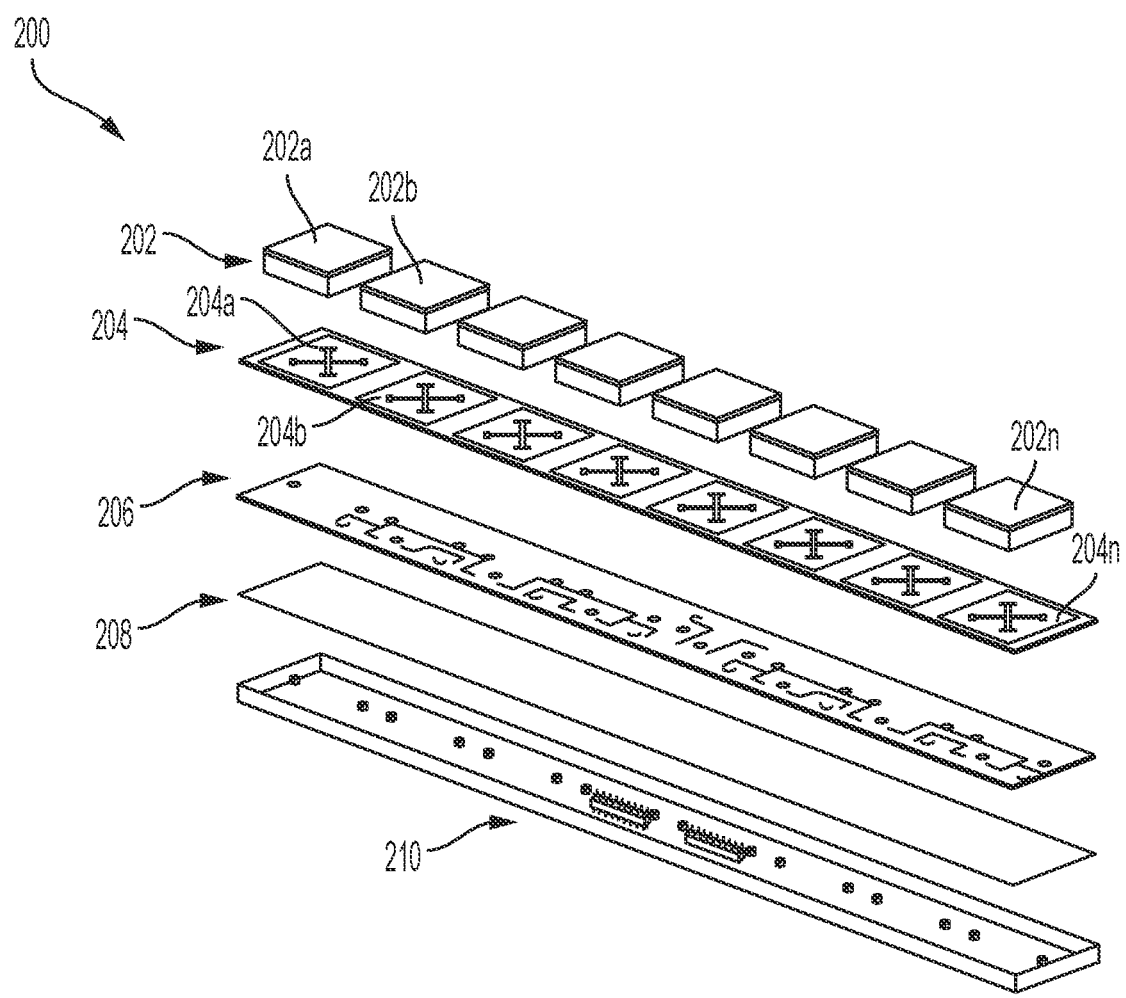
FIG. 2 shows an exploded view of a section of the patch antenna assembly of FIG. 1, showing the various layers of the segmented patch antenna assembly.
Figure 4:
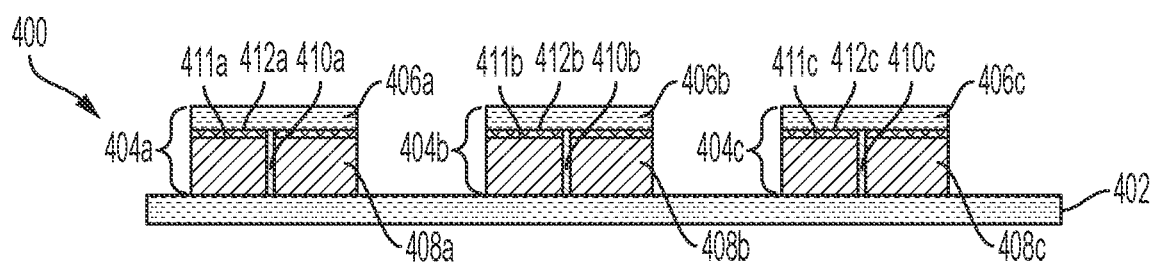
FIG. 4 shows a side view of a segmented patch antenna assembly according to an embodiment of the present invention.

FIG. 2 shows an exploded view 200 of a section of the segmented patch antenna assembly 102 of FIG. 1, showing the various layers of the segmented patch antenna assembly. The exploded view shows a patch layer 202, a radiator feed layer 204, a beamforming layer 206, a control logic layer 208 and a power connection layer 210. The patch layer 202 includes a plurality of patch assemblies 202a, 202b, . . . , 202n that are attached to the independently operable transmission feeds 204a, 204b, . . . , 204n of the radiator layer 204. Each of the plurality of patch assemblies 202a, 202b, . . . , 202n is formed on top of its respective transmission feed 204a, 204b, . . . , 204n. Each patch assembly 202a, 202b, . . . , 202n includes a precision mount and a patch surface on a top surface of the precision mount, the patch surface being exposed to space when the patch assembly is affixed to its corresponding transmission feed. A precision mount is generally either a compression bound between the two surfaces or a solder reflow between conducting surfaces. As shown in FIG. 4, the precision mount of a selected patch assembly is separated from the precision mount of an adjacent patch assembly by the air gap.

Referring still to FIG. 2, the radiator layer 204 can include a single dielectric layer in various embodiments or can include impedance matching and related circuits on multiple thin layers. The edges of the radiator layer 204 are free of an edge plate. The radiator layer 204 can included a transmission feed for providing electrical stimulation of the patch surface. The transmission feed (shown as transmission lines 410a, 410b, 410c and impedance matching circuits 411a, 411b, 411c on separate thin dielectric layers 412a, 412b, 412c, in FIG. 4) can be a dual-polarized transmission feed in various embodiments.

The radiator layer 204 is located on top of a beamforming layer 206. The beamforming layer 206 includes various circuitry and electronics for affecting or controlling the phase and/or relative amplitude of the combined RF signal generated at its associated patch, in order to control an angle of transmission of the beam through a pattern of constructive and destructive interference at the plurality of patches 202a, 202b, . . . , 202n. The beamforming layer 206 is formed on the control logic layer 208 and the electronics of the beamforming layer 206 is are controlled by control circuitry of the control logic layer 208. The control logic layer 208 is connected to a power connection layer 210.

Figure 3:
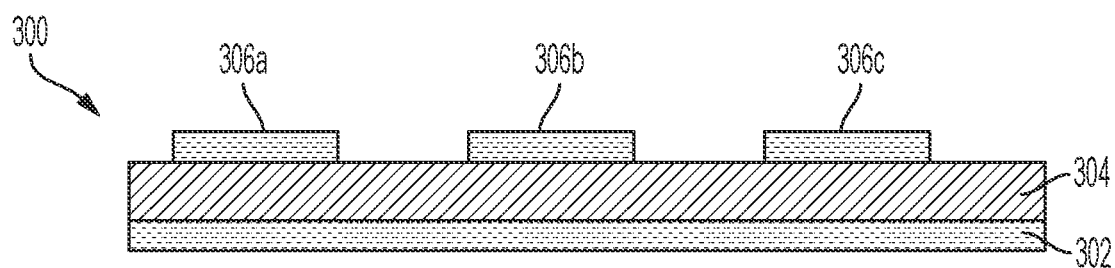
FIG. 3 shows a side view of a conventional patch antenna assembly in which a single substrate provides a continuous dielectric material upon which a plurality of patches are formed.

FIG. 3 shows a side view of a conventional patch antenna assembly in which a single substrate provides a continuous dielectric material upon which a plurality of patches is formed, also referred to herein as a waveguide patch antenna assembly 300. The continuous dielectric material provides a guide for surface waves formed during activation of the antenna. The waveguide patch antenna assembly 300 includes a conductive ground layer 302 and a substrate or dielectric layer 304 formed on the ground layer 302. A plurality of patch surfaces 306a, 306b, 306c are formed on the dielectric layer 304 at separate spaced apart locations. The dielectric extends into the spaces between the plurality of patch surfaces 306a, 306b, 306c and serves as a parallel plate waveguide for surface waves created at the patch surfaces 306a, 306b, 306c. Each of the patch surfaces 306a, 306b, 306c has an associated transmission line (not shown) for electrically connecting and impedance matching its associated patch surface to a power source that energizes the patch. The transmission line can be formed on top of the dielectric layer 304 or can be a center-fed transmission line that forms a conductive path that passes through the ground layer 302 and the dielectric layer 304 in order to attach to its associated patch surface.

FIG. 4 shows a side view of a segmented patch antenna assembly 400 according to an embodiment of the present invention. The segmented patch antenna assembly 400 includes a conductive ground layer 402 and a plurality of patches assemblies 404a, 404b, 404c formed on the ground layer 402 at separate spaced-apart locations. Each patch assembly 404a, 404b, 404c includes a patch surface 406a, 406b, 406c formed or residing on an associated precision mount 408a 408b, 408c and associated impedance matching circuit layers 411a, 411b, 411c and 412a, 412b, 412c. For example, patch assembly 404a includes patch surface 406a formed on precision mount 408a, patch assembly 404b includes patch surface 406b formed on precision mount 408b, and patch assembly 404c includes patch surface 406c formed on precision mount 408c. Each precision mount 408a, 408b, 408c is precision aligned with the conductive ground layer 402 and with the intended periodic location of the array elements. Each of the patch assemblies 404a, 404b, 404c has an associated transmission line 410a, 410b, 410c for electrically connecting its associated patch surface 406a, 406b, 406c to a power source that energizes the patch surface 406a, 406b, 406c. The transmission line can be formed on top of the associated impedance matching layer 411, 412 or can be a center-fed transmission line that forms a conductive path that passes through the ground layer 402 and the associated precision mount in order to attach to its associated patch surface. The transmission line (410a, 410b, 410c) can be made of copper. In various embodiments, the precision mount (e.g., precision mount 408a) and its associated transmission line (e.g., transmission line 410a) can be formed simultaneously using a plated through hole (PTH) technique or an additive manufacturing technique. In one embodiment, a continuous sheet of radiator patch surfaces can be formed. The continuous sheet can include the transmission lines formed therein. A first segment of the continuous sheet including a first patch surface can be removed to form the first radiator patch assembly 404a and a second segment of the continuous sheet including a second patch surface can be removed to form the second radiator patch assembly 404b.

Figure 5:
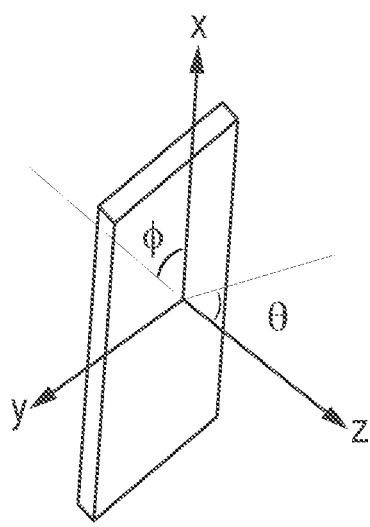
FIG. 5 shows an illustrative patch, absent its continuous conducting ground plane and surface showing a coordinate system associated with the patch for explanatory purposes.

FIG. 5 shows an illustrative patch surface (e.g., patch surface 406a) showing a coordinate system associated with the patch for explanatory purposes. The patch surface is shown absent its continuous conducting ground plane. A z-axis extends perpendicular to a surface of the patch and the array, the surface residing within an x-y plane. An azimuth angle $\varphi$ is defined with respect to the x-axis and a polar angle $\theta$ is defined with respect to the z-axis.

Figure 6:
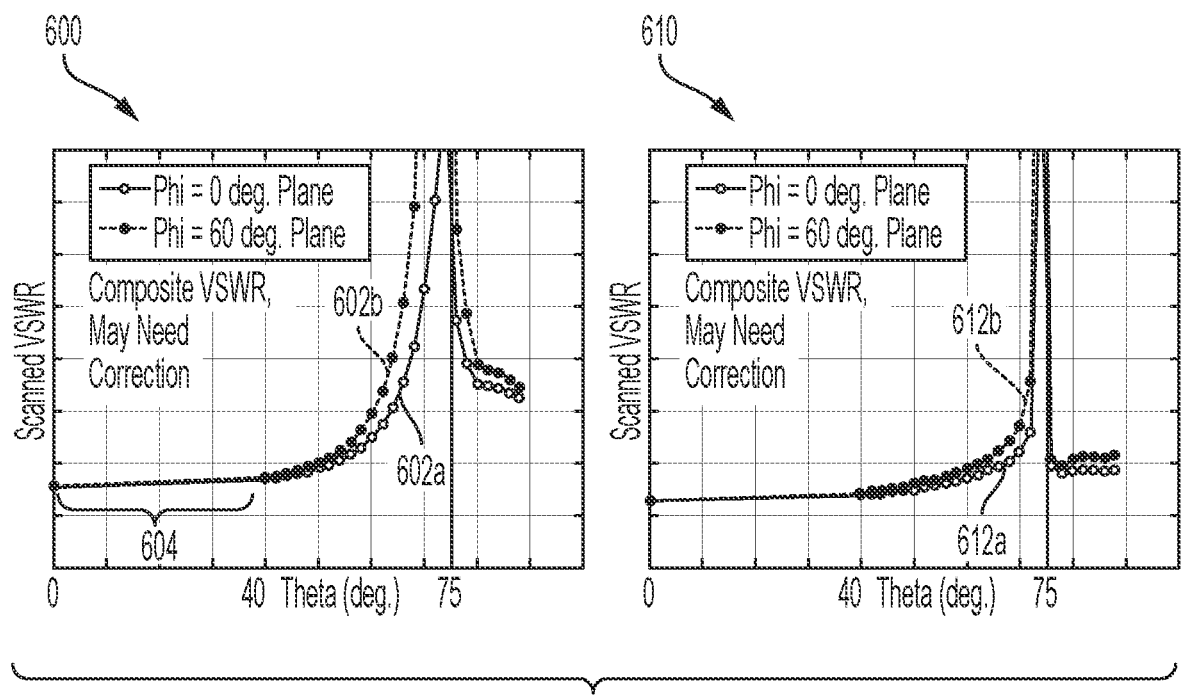
FIG. 6 shows two graphs illustrating a surface wave effect on the active Voltage Standing Wave Ratio (VSWR) of both a conventional and a segmented patch antenna assembly.

FIG. 6 shows two graphs 600 and 610 illustrating a full-wave simulated effect of a segmented patch antenna assembly with respect to its surface waves. Graph 600 shows a scanned voltage-standing wave ratio (Scanned VSWR) for a conventional (waveguide) patch antenna assembly, such as shown in FIG. 3. The VSWR is indicative of the magnitude of reflected energy in the subject radiator assembly. A high VSWR is indicative of a significant reflection within the system. By energy conservation, a high VSWR also means that proportionally less energy is available for radiation, the latter being the primary purpose of an array radiating system. Graph 610 shows a similarly full-wave simulated scanned VSWR for a segmented patch antenna assembly, such as shown in FIG. 4. For both graphs 600 and 610, scan VSWR is shown along the y-axis and the polar angle $\theta$ from the normal is shown along the x-axis in degrees. The intensity of the scan VSWR is dependent on the polar angle and is due to the existence of surface wave resonances through the antenna. These resonances appear at approximately the same general angle for both the waveguide patch antenna assembly of FIG. 3 and the segmented patch antenna assembly of FIG. 4, but with a distinctive difference. Both graphs (600, 610) show asymptotic VSWR behavior associated with a surface wave, even if the nature of this differs and can have a significant impact on phased array system performance and cost.

In graph 600, curve 602a shows a standing VSWR in a first plane oriented at an azimuth of $\varphi=0$ degrees and curve 602b shows a standing VSWR in a second plane oriented at an azimuth of $\varphi=60$ degrees at a selected operating frequency (F3). Both of these constant phi planes intersect with grating lobes and associated surface waves in this example calculation. For both curves 602a and 602b, the VSWR is approximately at a minimum in a polar angle range from about 0 degrees to about 40 degrees. Curve 602a shows a moderate growth region in scanned VSWR in a polar angle range between about 40 degrees and about 58 degrees and shows a highly vertical slope at polar angle above about 58 degrees. The curve 602b shows a slower growth in scan VSWR in a moderate growth region from between about 40 degrees and about 62 degrees and shows a highly vertical slope at polar angles above about 62 degrees. The highly vertical slopes of curves 602a and 602b reach unacceptable VSWR values at a limit angle of 60 degrees for the conventional patch, and 71 degrees for the segmented patch. Thus, the scan volume for the segmented patch antenna is greater than the scan volume for the conventional patch antenna.

In graph 610, curve 612a shows a standing VSWR in a first plane oriented at an azimuth of $\varphi=0$ degrees and curve 612b shows a standing VSWR in a second plane oriented at an azimuth of $\varphi=60$ degrees. For both curves 612a and 612b, the VSWR is approximately at a minimum from a polar angle of 0 degrees to about 40 degrees. Curves 612a and 612b increase in intensity slower that the corresponding curves 602a and 602b in the polar angle regions of about θ=40 degrees to about θ=70 degrees. In particular, the curve 602a shows a slow growth in scanned VSWR in a moderate growth region for a polar angle range from about 40 degrees to about 70 degrees and shows a highly-vertical slope for a polar angles above about 70 degrees. Curve 602b shows a slightly greater growth in scan VSWR (compared to curve 620a) in a moderate growth region in a polar angle range from about 40 degrees to about 68 degrees and shows a highly-vertical slope for polar angles above about 68 degrees. Due to the angular extent of the moderate growth regions for curves 612a and 612b, in comparison to curves 602a and 602b, the segmented patch assembly associated with curves 612a and 612b has a broader scanning angle than the waveguide patch antenna associated with curves 602a and 602b.

Figure 7:
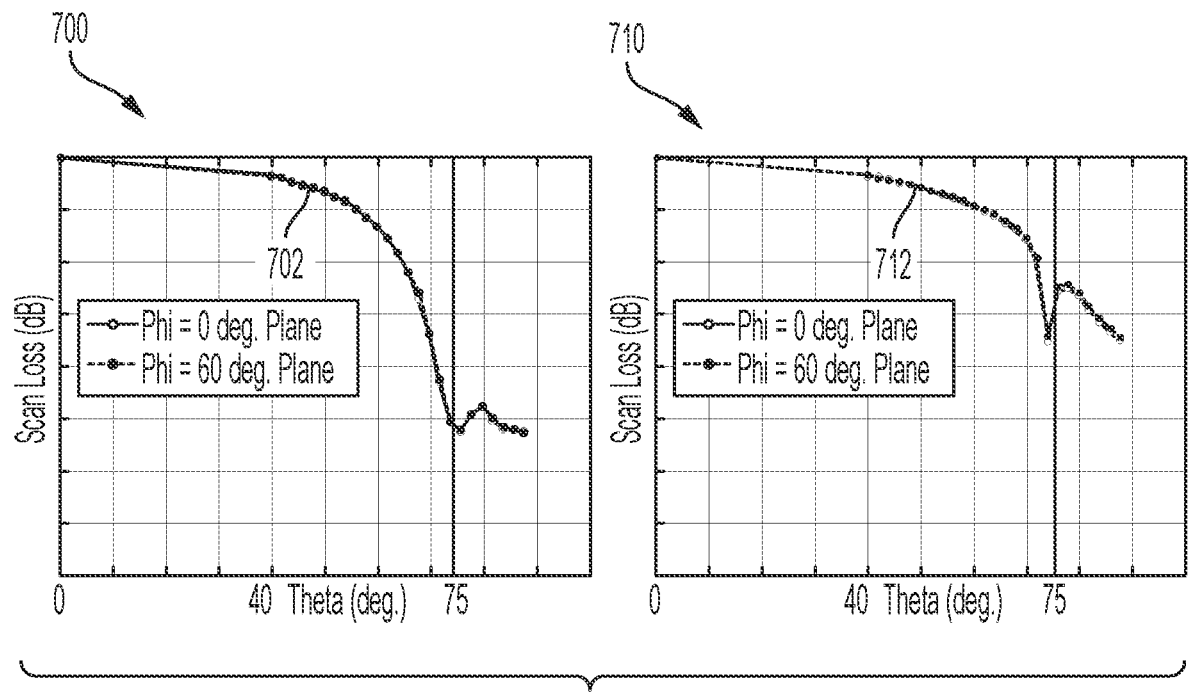
FIG. 7 shows two graphs illustrating scan loss vs. polar angle for both a continuous waveguide model and a segmented patch antenna assembly.

FIG. 7 shows two graphs 700 and 710 illustrating scan loss vs. polar angle for both a continuous waveguide model and a segmented patch antenna assembly. Graph 700 shows scan loss for the conventional waveguide patch assembly such as shown in FIG. 3. Graph 710 shows scan loss for the segmented patch assembly model shown in FIG. 4. Scan loss is shown along the y-axis and the polar angle θ from the normal is shown along the x-axis in degrees.

Curve 702 shows one-way scan loss of graph 700. The scan loss is approximately the same regardless of the orientation (φ) angle. Thus, curve 702 is generally representative of scan loss along both the φ=0 degree plane the φ=60-degree plane. Similarly, curve 712 shows scan loss for graph 710. The scan loss is approximately the same regardless of the orientation (φ) angle. Thus, curve 712 is generally representative of scan loss along both the φ=0 degree plane the φ=60-degree plane.

Curve 702 shows a relatively small scan loss that increases with polar angle (θ) to reach a maximum scan loss value at about θ=75 degrees, corresponding to the maximum VSWR shown in FIG. 6. Curve 712 also shows a scan loss that increases with polar angle to reach a minimum value. However, the maximum scan loss of curve 712 is considerably less than the maximum scan loss of curve 702. At the limit angles of 62 degrees for the conventional patch antenna and 71 degrees for the segmented patch antenna, there is an additional performance advantage for the segmented path antenna in terms of the total scan loss.

The scanned VSWR (600, 610 of FIG. 6) and scan loss data (700, 710 of FIG. 7) demonstrate that the segmented patch antenna has improved performance over the conventional patch antenna due to either additional scan coverage for an existing phased array lattice or transcendental reduction in the array's element count for an equivalent scan volume. Since the relationship between element count and scan coverage is transcendental, the segmented patch advantage can be disproportionately substantial. For example, in the case study disclosed herein, the element count reduction is 6.7%. This represents a linearly proportional reduction in all associated support systems in the phased array system (thermal, structural, and electronics).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An antenna, comprising:
   a beamforming layer;
   a radiator feed layer mounted on the beamforming layer, the radiator feed layer including a first transmission feed and a second transmission feed, wherein the radiator feed layer is free of an edge plate;
   a first radiator patch assembly attached to the radiator feed layer at the first transmission feed, the first radiator patch assembly including a first mount, a first patch surface and a first transmission line passing from the radiator feed layer through the first mount to the first patch surface; and
   a second radiator patch assembly attached to the radiator feed layer at the second transmission feed, the second radiator patch assembly including a second mount, a second patch surface and a second transmission line passing from the radiator feed layer through the second mount to the second patch surface, wherein the first radiator patch assembly is separated from the second radiator patch assembly by an air gap.

2. The antenna of claim 1, wherein the radiator feed layer includes the first transmission line attached to the first radiator patch assembly and the second transmission line attached to the second radiator patch assembly.

3. The antenna of claim 1, wherein the second mount is separated from the first mount by the air gap.

4. The antenna of claim 1, wherein the first transmission line is a center-fed transmission line and the second transmission line is a center-fed transmission line.

5. The antenna of claim 1, wherein the first radiator patch assembly further comprises impedance matching on separate thin dielectric substrate layers.

6. The antenna of claim 4, wherein the first transmission line is formed within the first mount via additive manufacturing, a compression bound between the two surfaces, or a solder reflow between conducting surfaces.

7. The antenna of claim 4, wherein the center-fed transmission line is made of copper.

8. The antenna of claim 1, wherein an edge of the antenna is free of an edge plate.

9. The antenna of claim 1, wherein at least one of the first transmission line and the second transmission line is a dual-polarized transmission line.

10. The antenna of claim 1, wherein the radiator feed layer is a single dielectric layer.

11. A method of manufacturing an antenna, comprising:
    forming a radiator feed layer on a beamforming layer, the radiator feed layer including a first transmission feed and a second transmission feed, wherein the radiator feed layer is free of an edge plate;
    attaching a first radiator patch assembly to the first transmission feed of the radiator feed layer, the first radiator patch assembly including a first mount, a first patch surface and a first transmission line passing from the radiator feed layer through the first mount to the first patch surface; and attaching a second radiator patch assembly to the second transmission feed of the radiator feed layer, the second radiator patch assembly including a second mount, a second patch surface and a second transmission line passing from the radiator feed layer through the second mount to the second patch surface, wherein the first radiator patch assembly is separated from the second radiator patch assembly by an air gap.

12. The method of claim 11, further comprising coupling the first transmission line from the radiator feed layer to the first radiator patch assembly and coupling the second transmission line from the radiator feed layer to the second radiator patch assembly.

13. The method of claim 11, further comprising coupling the first mount to the radiator feed layer and coupling the second mount to the radiator feed layer separated from the first mount by the air gap.

14. The method of claim 11, wherein forming the first transmission line as a center-fed transmission line and the first mount concurrently using additive manufacturing.

15. The method of claim 11, further comprising forming a continuous sheet of radiator patch surfaces and removing a first segment of the continuous sheet including the first patch surface to form the first radiator patch assembly and a second segment of the continuous sheet including the second patch surface to form the second radiator patch assembly.

16. The method of claim 14, wherein the center-fed transmission line is dual-polarized radiator feed transmission line.

17. The antenna of claim 1, wherein the beamforming layer is formed on a control logic layer.

* * * * *